(No Model.)

A. F. JONES.
FEEDING ATTACHMENT FOR TAN PRESSES.

No. 451,304. Patented Apr. 28, 1891.

WITNESSES:
Chas. Nida
C. Sedgwick

INVENTOR:
A. F. Jones
BY Munn & Co.
ATTORNEYS

UNITED STATES PATENT OFFICE.

ALBERT FRANCIS JONES, OF SALEM, MASSACHUSETTS, ASSIGNOR TO HIMSELF AND JOSEPH H. POOR, OF SAME PLACE.

FEEDING ATTACHMENT FOR TAN-PRESSES.

SPECIFICATION forming part of Letters Patent No. 451,304, dated April 28, 1891.

Application filed October 18, 1890. Serial No. 368,545. (No model.)

*To all whom it may concern:*

Be it known that I, ALBERT FRANCIS JONES, of Salem, in the county of Essex and State of Massachusetts, have invented a new and useful Feeding Attachment for Tan-Presses, of which the following is a full, clear, and exact description.

My invention relates to a feeding attachment for tan-presses, and has for its object to provide a simple agitating device capable of attachment to any tan-press, and which will constantly and steadily feed the bark shavings to the pressure-rolls of the press.

The invention consists in the novel construction and combination of the several parts, as will be hereinafter fully set forth, and pointed out in the claims.

Reference is to be had to the accompanying drawings, forming a part of this specification, in which similar figures and letters of reference indicate corresponding parts in all the views.

Figure 1:
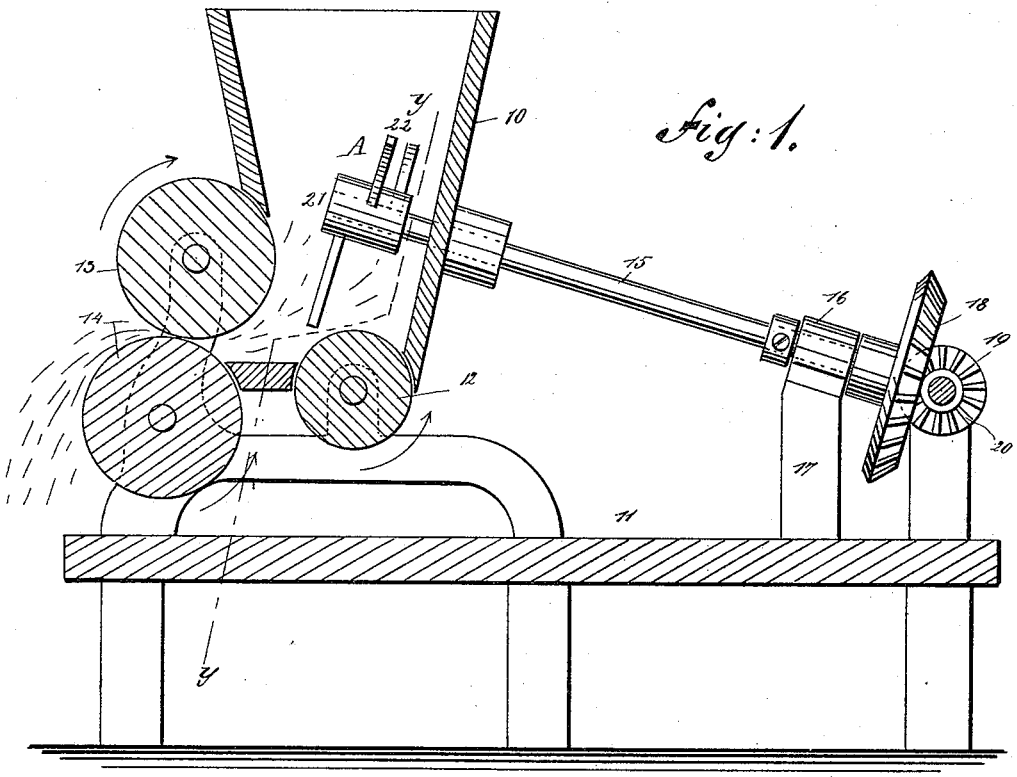
Figure 2:
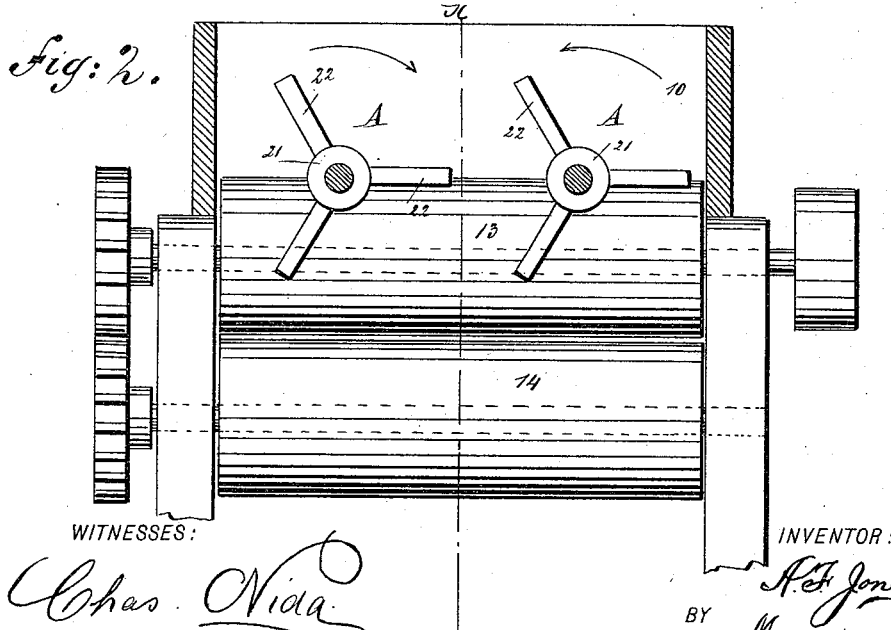

Figure 1 is a transverse section through the press, taken on the line $xx$ of Fig. 2; and Fig. 2 is a longitudinal section through the press on line $y\ y$ of Fig. 1.

Tanning-bark is ordinarily reduced to thin strips or shavings before entering the press, as is now almost the universal custom. In practice the feeding-roll of the press often fails to properly carry the strips of tan to the pressure-rolls, and the prime object of this invention is to remedy such defects by providing for a constant agitation of the tan in the direction of the pressure-rolls.

The press-crib 10 may be of any suitable or approved construction. The said crib, however, is ordinarily made essentially funnel-shaped, as illustrated in Fig. 1. The crib is secured upon the frame 11 in the ordinary way, and is provided at its bottom at or near the rear side with an opening, in which opening the feed-roller 12 revolves, about half of the peripheral surface of the roller being within the crib. Another opening is also produced in the front of the crib at the bottom thereof, and in front of this opening, in essential contact with the walls thereof, the two pressure-rolls 13 and 14 of the crib are held to revolve in suitable bearings.

Through the rear face of the crib the forward ends of one or more shafts 15 are introduced, which shafts are preferably two in number, and are given a downward and rearward inclination. The rear ends of the shafts are held to turn in bearings 16, formed upon the upper ends of standards 17, secured to the base of the press, and upon the rear extremity of each shaft a beveled gear 18 is rigidly secured, and the bevel-gears 18 of the shafts are made to mesh with bevel-pinions 19, attached to a rear shaft 20, which shaft is revolved in any suitable or approved manner.

Upon the forward end of each shaft within the crib an agitator A is firmly fastened. Each agitator is alike in construction, and consists of a hub 21, and arms 22 radially projected from said hub, which arms are located at intervals upon the hub, one being, for instance, situated near the forward end, another near the center, and a third near the rear end of the hub, as is best shown in Fig. 1. Thus each arm travels in a path of its own.

When the shafts 15 are revolved and the agitators are set thereby in motion, the agitators revolve in opposite directions or in the direction of each other, as shown by the arrows in Fig. 2, and each arm of the agitator carries with it a portion of the tan shavings, and feeds the said shavings directly to the pressure-rolls, the feeding-roller 12 at the bottom of the crib rendering material assistance; but without the agitators A the tan shavings become bunched in the crib, and the feed-roller, when they become so bunched, has but little effect upon them. The agitators, however, effectually remedy this defect, and not only separate the shavings, but also throw them in front of the feed and practically between the pressure-rolls.

It will be understood that any required number of agitators and driving-shafts therefor may be employed. Two agitators, however, as heretofore mentioned, are ordinarily sufficient.

Having thus described my invention, I claim as new and desire to secure by Letters Patent—

1. The combination, with a tan-press, of revolving agitators in the crib of the press, the axes of the agitators being inclined and approximately at right angles to the axes of the pressure-rolls, substantially as described.

2. The combination, with the crib and pressure-rolls of a tan-press, of agitators in the crib of the press and revolving in the direction of each other, the axes of the agitators being inclined and approximately at right angles to the axes of the pressure-rolls, substantially as and for the purpose set forth.

3. The combination, with a tan-press provided with a feed-roller in its crib, of two inclined shafts projecting into the crib of the press above the feed-roller and at right angles to the pressure-rolls, agitator-arms secured to the ends of the shafts within the crib, and means for revolving the shafts in opposite directions toward each other, substantially as herein shown and described.

ALBERT FRANCIS JONES.

Witnesses:
SARAH T. HILL,
ANNIE M. KELLY.